US010631079B2

(12) United States Patent
Kulkarni et al.

(10) Patent No.: US 10,631,079 B2
(45) Date of Patent: Apr. 21, 2020

(54) FLEXIBLE CARPENTER'S STYLUS WITH DOCKABLE EARPIECE

(71) Applicant: Microsoft Technology Licensing, LLC, Redmond, WA (US)

(72) Inventors: Prajakta Ashish Kulkarni, Redmond, WA (US); Ashish Arvind Kulkarni, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 14 days.

(21) Appl. No.: 15/836,500

(22) Filed: Dec. 8, 2017

(65) Prior Publication Data
US 2019/0182579 A1    Jun. 13, 2019

(51) Int. Cl.
*H04R 1/10* (2006.01)
*H04M 1/60* (2006.01)
(Continued)

(52) U.S. Cl.
CPC ....... *H04R 1/1091* (2013.01); *G06F 3/03545* (2013.01); *H04M 1/6066* (2013.01); *H04R 1/105* (2013.01); *H04R 1/1016* (2013.01); *H04R 1/1025* (2013.01); *H04W 4/80* (2018.02); *G06F 2203/04102* (2013.01); *H04R 2201/107* (2013.01); *H04R 2420/07* (2013.01); *H04R 2460/13* (2013.01)

(58) Field of Classification Search
CPC .... H04R 1/1091; H04R 1/1025; H04R 1/105; H04W 4/80; H04M 1/6066
See application file for complete search history.

(56) References Cited

U.S. PATENT DOCUMENTS

| 6,819,762 | B2 | 11/2004 | Jones et al. |
| 7,590,233 | B2 | 9/2009 | Chiloyan |
| 2007/0205996 | A1* | 9/2007 | Huang ................ G06F 3/03545 345/179 |

(Continued)

FOREIGN PATENT DOCUMENTS

| CN | 2816915 Y | * | 9/2006 |
| CN | 2816915 Y | | 9/2006 |

(Continued)

OTHER PUBLICATIONS

"2 in 1 Multipoint Bluetooth Headset Handsfree + Capacitive Touch Screen Stylus For Iphone 5 / Iphone 4 & 4s / 3gs / Ipad 2 / Samsung Galaxy Tab, Supports Two Bluetooth Devices Simultaneously, Operating Distance: MAX 10M (WHITE)", Retrieved From: <<https://alexnld.com/product/2-in-1-multipoint-bluetooth-headset-handsfree-capacitive-touch-screen-stylus-for-iphone-5-iphone-4-4s-3gs-ipad-2-samsung-galaxy-tab-supports-two-bluetooth-devices-simultaneously-operating-distance-max/>>, Retrieved on: Oct. 5, 2017, 7 pages.

(Continued)

*Primary Examiner* — Mark Edwards
(74) *Attorney, Agent, or Firm* — Alleman Hall Creasman & Tuttle LLP (57) ABSTRACT

A computer peripheral includes a stylus having a capacitive stylus nib and an earpiece dock. An earpiece is removably dockable at the earpiece dock. The earpiece includes a speaker, an earpiece battery, and a wireless radio configured to communicatively couple with a host device. The computer peripheral further includes a charger configured to receive power, and while the earpiece is docked, to use the power to charge the earpiece battery.

23 Claims, 9 Drawing Sheets

(51) Int. Cl.
*H04W 4/80* (2018.01)
*G06F 3/0354* (2013.01)

(56) References Cited

U.S. PATENT DOCUMENTS

| | | | | |
|---|---|---|---|---|
| 2007/0249411 | A1* | 10/2007 | Hyatt | H04M 1/6066 |
| | | | | 455/569 |
| 2013/0106723 | A1* | 5/2013 | Bakken | G06F 3/03545 |
| | | | | 345/173 |
| 2013/0106798 | A1 | 5/2013 | Sundara-rajan et al. | |
| 2014/0035884 | A1* | 2/2014 | Oh | G06F 3/03545 |
| | | | | 345/179 |
| 2014/0270227 | A1 | 9/2014 | Swanson | |
| 2014/0333553 | A1 | 11/2014 | Yun et al. | |
| 2015/0256010 | A1* | 9/2015 | Scandurra | H02J 7/0044 |
| | | | | 320/107 |
| 2016/0077843 | A1* | 3/2016 | Jakoboski | G06F 1/266 |
| | | | | 710/8 |
| 2016/0182699 | A1 | 6/2016 | Hou | |
| 2016/0291706 | A1* | 10/2016 | Trutna | G06F 3/03545 |
| 2017/0068341 | A1 | 3/2017 | Zimmerman et al. | |
| 2017/0223163 | A1 | 8/2017 | Li et al. | |

FOREIGN PATENT DOCUMENTS

| | | |
|---|---|---|
| CN | 202617323 U * | 12/2012 |
| EP | 2696263 A1 | 2/2014 |
| WO | 2016015619 A1 | 2/2016 |

OTHER PUBLICATIONS

"Elecom", Retrieved From: <<http://www.elecom.co.jp.e.gj.hp.transer.com/news/201403/lbt-phs02mpsv/index.html>>, Mar. 4, 2014, 2 Pages.

Bell, Killian, "LG's Next Wearable Is Little More Than a Colorful Stylus [Leak]", Retrieved From: <<https://www.cultofandroid.com/54986/lgs-next-wearable-little-colorful-stylus-leak/>>, Mar. 18, 2014, 3 Pages.

Nuredinov, Yerzhan, "iPhone Stylus Becomes Bluetooth Headset Dexim Music Talking Stylus", Retrieved From: <<https://www.youtube.com/watch?v=qeTD2SjSNV4>>, Jun. 12, 2013, 4 Pages.

"International Search Report and Written Opinion Issued in PCT Application No. PCT/US18/062382", dated Feb. 18, 2019, 11 Pages.

* cited by examiner

FLEXIBLE CARPENTER'S STYLUS WITH DOCKABLE EARPIECE

BACKGROUND

Computer peripherals, such as a writing stylus, can increase the functionality of a host computing device. Some host computing devices include built-in storage for storing one or more computer peripherals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer peripheral includes a stylus having a capacitive stylus nib and an earpiece dock. An earpiece is removably dockable at the earpiece dock. The earpiece includes a speaker, an earpiece battery, and a wireless radio configured to communicatively couple with a host device. The computer peripheral further includes a charger configured to receive power, and while the earpiece is docked, to use the power to charge the earpiece battery.

DETAILED DESCRIPTION

The present disclosure is directed to computer peripherals that include dockable earpieces, in general, and styluses that include dockable earpieces, specifically. In one example, a carpenter's stylus has the shape of a pen with a non-circular cross section. A rigid portion of the carpenter's stylus includes the writing end (or "nib") and provides a comfortable gripping surface. A flexible portion makes up the rest of the body of the carpenter's stylus. The carpenter's stylus can be used as an input device for a touch screen display. Additionally, the flexible portion has an integrated dock that can hold a dockable wireless earpiece. The earpiece dock securely stores the wireless earpiece and provides power to charge a battery of the wireless earpiece. The flexible portion of the carpenter's stylus can be bent into a headset shape, allowing the whole peripheral to be worn over a user's ear. When the carpenter's stylus is worn as a headset, the earpiece remains fully functional. Thus, the user can wear the carpenter's stylus on their ear, while also using the peripheral as a hands-free headset. Alternately, the earpiece can be removed from the carpenter's stylus and used independently of the stylus body as the stylus body is used as a touch input device.

While a carpenter's stylus is provided as a non-limiting example of a computer peripheral, it is to be understood that other computer peripherals are within the scope of this disclosure. Other non-limiting examples include a non-flexible stylus in the shape of a carpenter's pen with an earpiece dock, a stylus with a circular cross section (either flexible or non-flexible) with an earpiece dock, and a computer peripheral in the shape of a wearable headset with an earpiece dock.

Figure 1A:
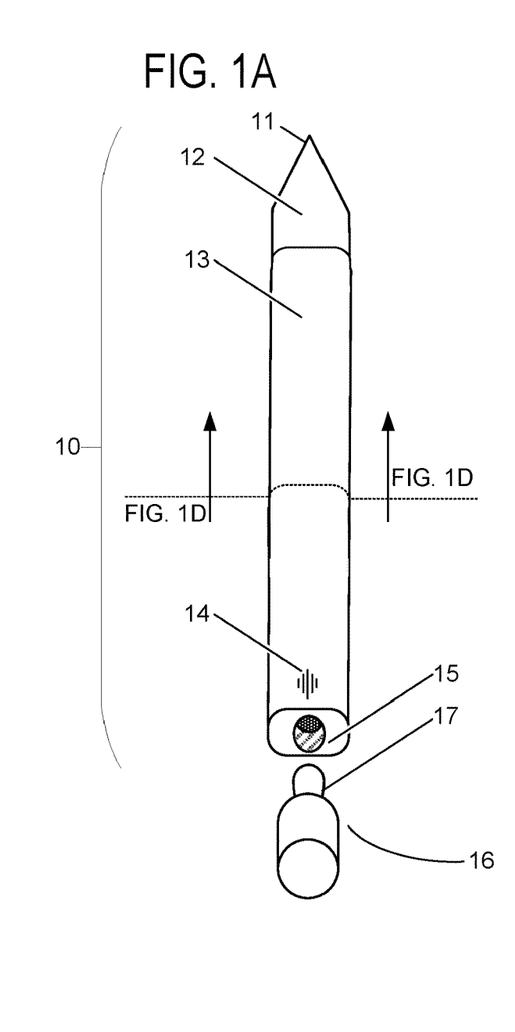
FIGS. 1A-1D show an example flexible carpenter's stylus with a dockable earpiece.

FIG. 1A shows aspects of an exemplary computer peripheral in the form of a carpenter's stylus. The computer peripheral includes a flexible stylus 10 and an earpiece 16. The flexible stylus includes a capacitive stylus nib 11, which may be used as an input object for a capacitive touch input device, such as a capacitive touch screen display. A rigid portion 12 extends from capacitive stylus nib 11. Rigid portion 12 is typically 1 to 1.5 inches in length, but may be any suitable size. A flexible portion 13 extends from an end of rigid portion 12 that is distal to capacitive stylus nib 11. An end of flexible portion 13 that is distal to rigid portion 12 terminates at an earpiece dock 15.

Figure 1B:
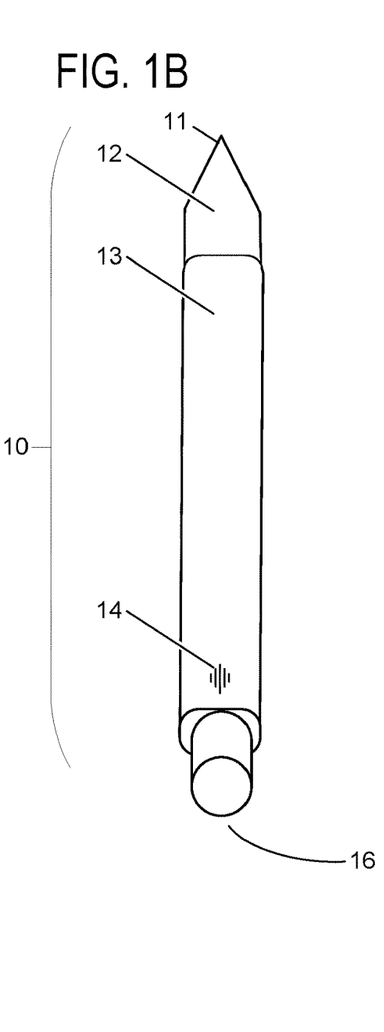
Figure 1C:
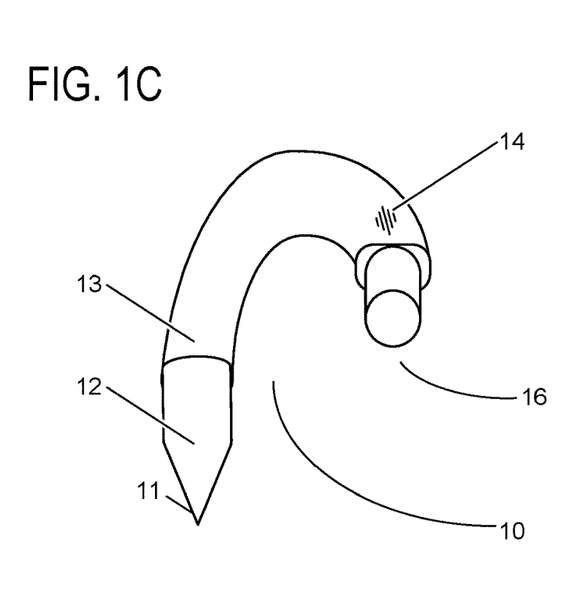

Earpiece 16 is removably dockable at earpiece dock 15, and may be removed as depicted in FIG. 1A, or docked as depicted in FIGS. 1B and 1C. Earpiece 16 optionally includes a flexible ear insert 17 which may be inserted into earpiece dock 15.

Flexible portion 13 may be flexed to be in a straight configuration, as shown in FIGS. 1A and 1B, or a curved configuration as shown in FIG. 1C. As will be described in detail below, functionality of the computer peripheral, including functionality of flexible stylus 10 and/or earpiece 16, is configured to change based on whether or not earpiece 16 is docked at earpiece dock 15 and whether or not flexible portion 13 is in a curved configuration.

Figure 1D:
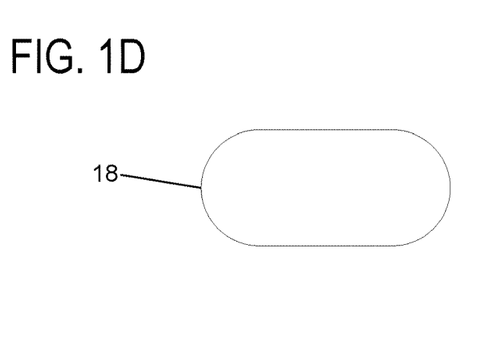

Flexible stylus 10 optionally may be shaped with a non-circular cross section, and optionally may have at least one substantially flat edge, as with the oval shape depicted in FIG. 1D. Shape outline 18 depicts the cutting plane shown in FIG. 1A, and shows the non-circular external shape of flexible stylus 10. The non-circular shape helps prevent the flexible stylus from rolling when placed on a surface. The non-circular shape may aid the user in firmly gripping the flexible stylus, facilitating precise inking inputs (e.g., for writing and/or artwork). When the flexible stylus is in the curved configuration (for example flexible stylus 10 in FIG. 1C), the non-circular shape may additionally provide for a firm grip when worn around a user's ear (as will be described below with reference to FIGS. 6A-6C).

Figure 2A:
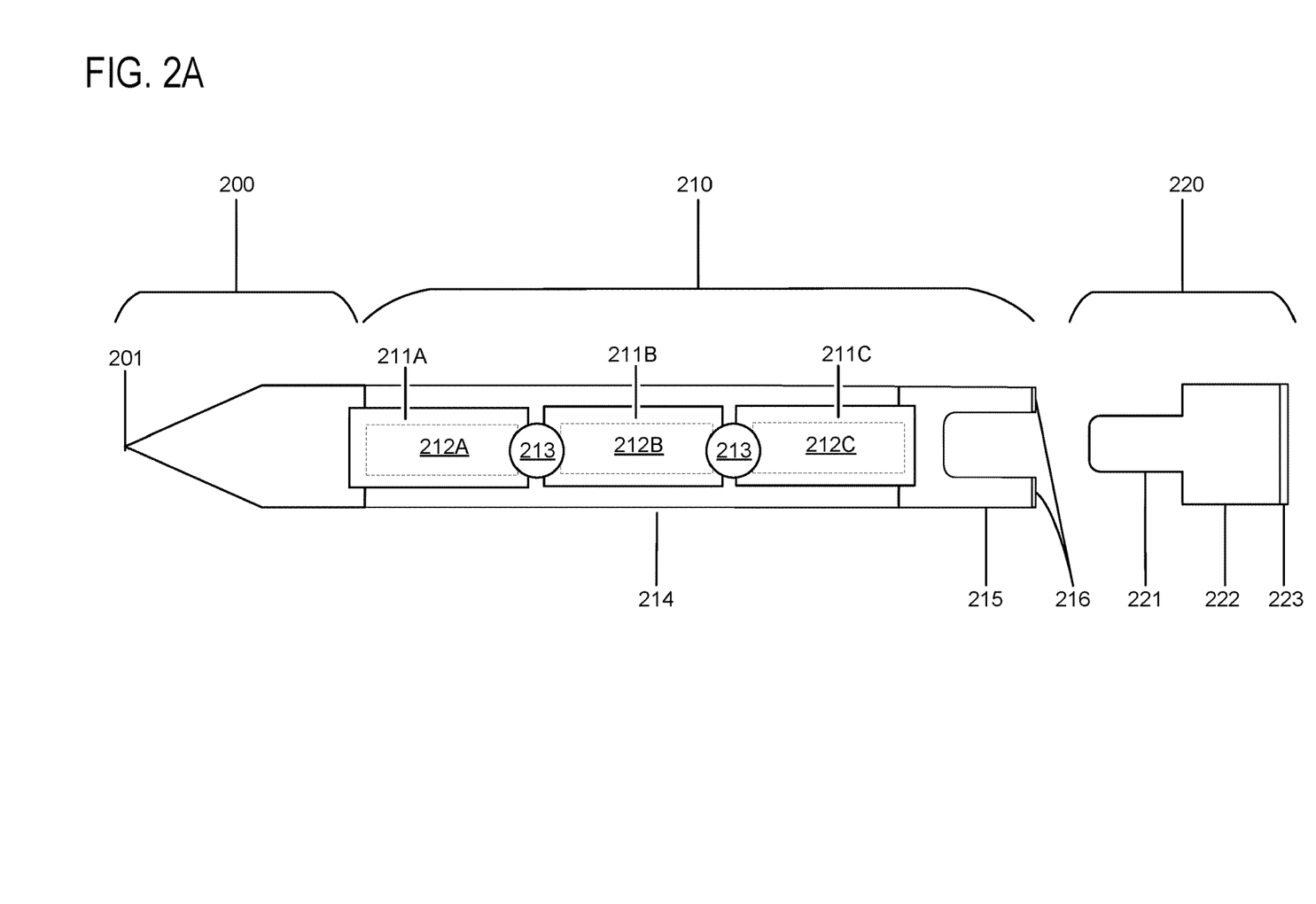
FIGS. 2A-2B show an example flexible carpenter's stylus with a dockable earpiece.
Figure 2B:
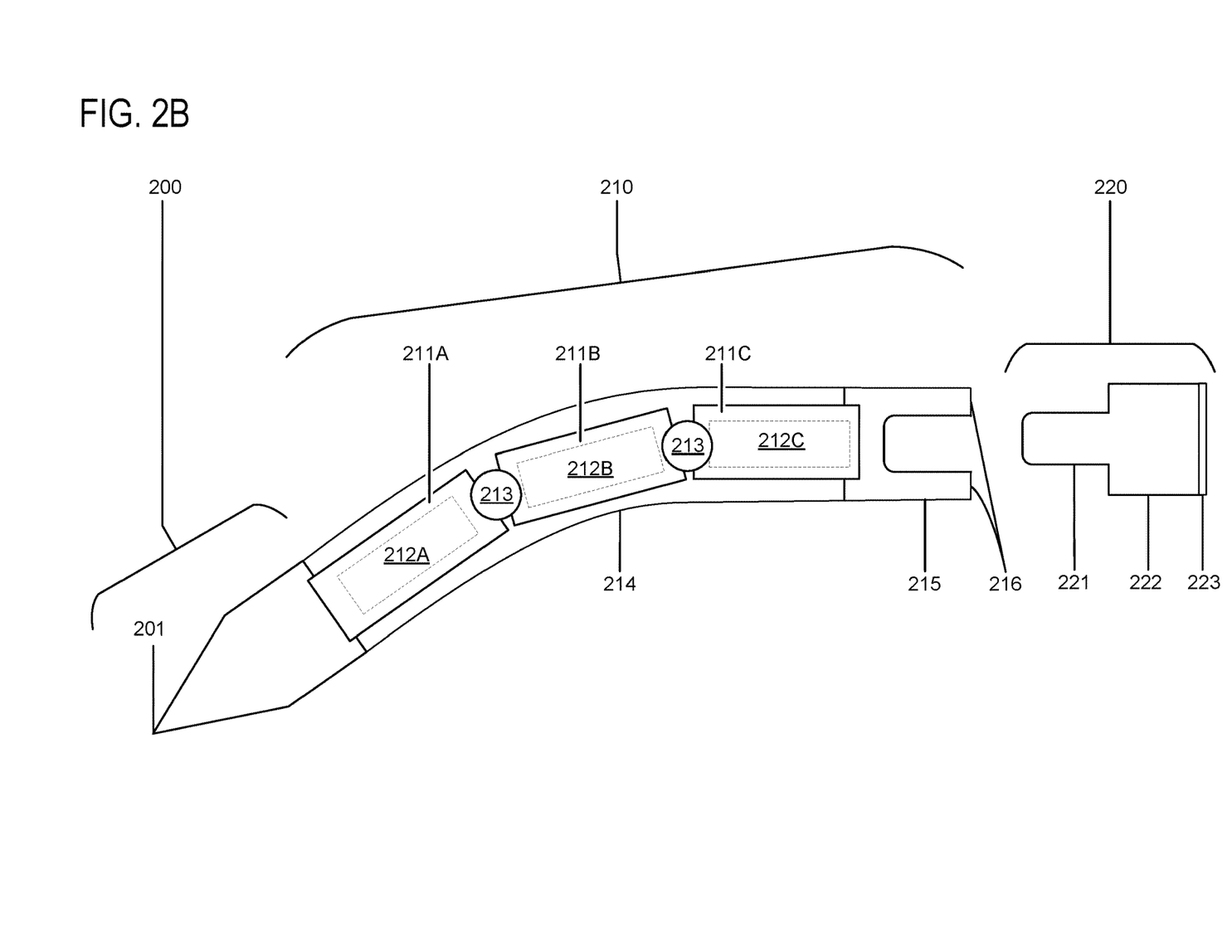

FIG. 2A shows aspects of a flexible stylus comprising rigid portion 200 and an example flexible portion 210, alongside an earpiece 220. Rigid portion 200 includes capacitive stylus nib 201. A rigid housing extends from the capacitive stylus nib towards the flexible portion. In the illustrated example, flexible portion 210 is an articulated linkage made of two or more rigid segments connected by joints 213, such as the three rigid segments 211A, 211B, and 211C depicted in FIG. 2A. Joints 213 allow the articulated linkage to be flexed into a straight configuration as in FIG. 2A, or in a curved configuration as depicted in FIG. 2B. The two or more rigid segments are surrounded by a flexible sleeve 214 made of a compliant material. Joints 213 may be hinges, ball-socket joints, flexible joints made of a compliant material, or any other suitable joint structure. Joints 213 may be configured such that a substantially flat edge of the stylus remains in plane while the flexible portion is in the curved configuration. For example, when the pen shape includes an oval cross section as described above with reference to FIG. 1D, joints 213 may be hinges configured to be parallel to a semi-minor axis of the oval cross section. This configuration allows rotation around the semi-minor axis of the oval cross section. Joints 213 may provide variable resistance throughout their range of flexing. For example, joints 213 may allow "clicking" into fixed positions according to evenly spaced angles, while also allowing movement (without "clicking") through intermediate angles. Joints 213 may allow movement in either of two opposite directions, permitting the flexible stylus to be bent into two different mirror-image configurations (a "left-handed" configuration and a "right-handed" configuration). Such mirror-image configurations of the flexible stylus facilitate the user operating and/or configuring the flexible stylus with either a left or right hand, while also facilitating the user wearing the flexible stylus on either a left or right ear. Flexible sleeve 214 may additionally bias the joints 213, inhibiting movement unless sufficient force is applied. Components of rigid portion 200 and flexible portion 210 may be connected in any suitable manner. In one example, flexible portion 210 may include two or more wires connecting rigid portion 200 to earpiece dock 215 and/or to other internal components 212A, 212B, and 212C housed within the rigid segments 211A, 211B, and 211C of flexible portion 210. In this example, the two or more wires may be threaded through a hollow internal cavity of the rigid segments.

Earpiece body 222 may include any suitable components of an earpiece (e.g., a speaker and a microphone) as will be described below. Earpiece 220 may attach to earpiece dock 215 in any suitable manner. In an example where flexible portion 210 comprises an articulated linkage of rigid segments, earpiece 220 may include a flexible ear insert 221, earpiece dock 215 may include a recessed cavity at a terminal rigid segment of flexible portion 210, and earpiece 220 may attach to earpiece dock 215 by inserting flexible ear insert 221 into the recessed cavity of earpiece dock 215. In this or other examples, earpiece 220 may alternately or additionally be attached to earpiece dock 215 via a magnetic or mechanical connector. In some examples, the earpiece dock may include a breakable power/data link.

Earpiece dock 215 may optionally include a capacitive element 216. Capacitive element 216 of earpiece dock 215 is depicted at the end of earpiece dock 215 distal to rigid portion 200, surrounding the recessed cavity of the earpiece dock. Earpiece 220 similarly may optionally include a capacitive element 223. Capacitive elements 216 and 223 may have capacitances distinct from capacitive stylus nib 201, so that each one can be independently capacitively recognized by a host device. For example, capacitive stylus nib 201 may be used to provide inking input functionality, capacitive element 216 of earpiece dock 215 may be used to provide inking eraser functionality, and capacitive element 223 of earpiece 220 may be used to provide inking highlighter functionality.

Figure 3:
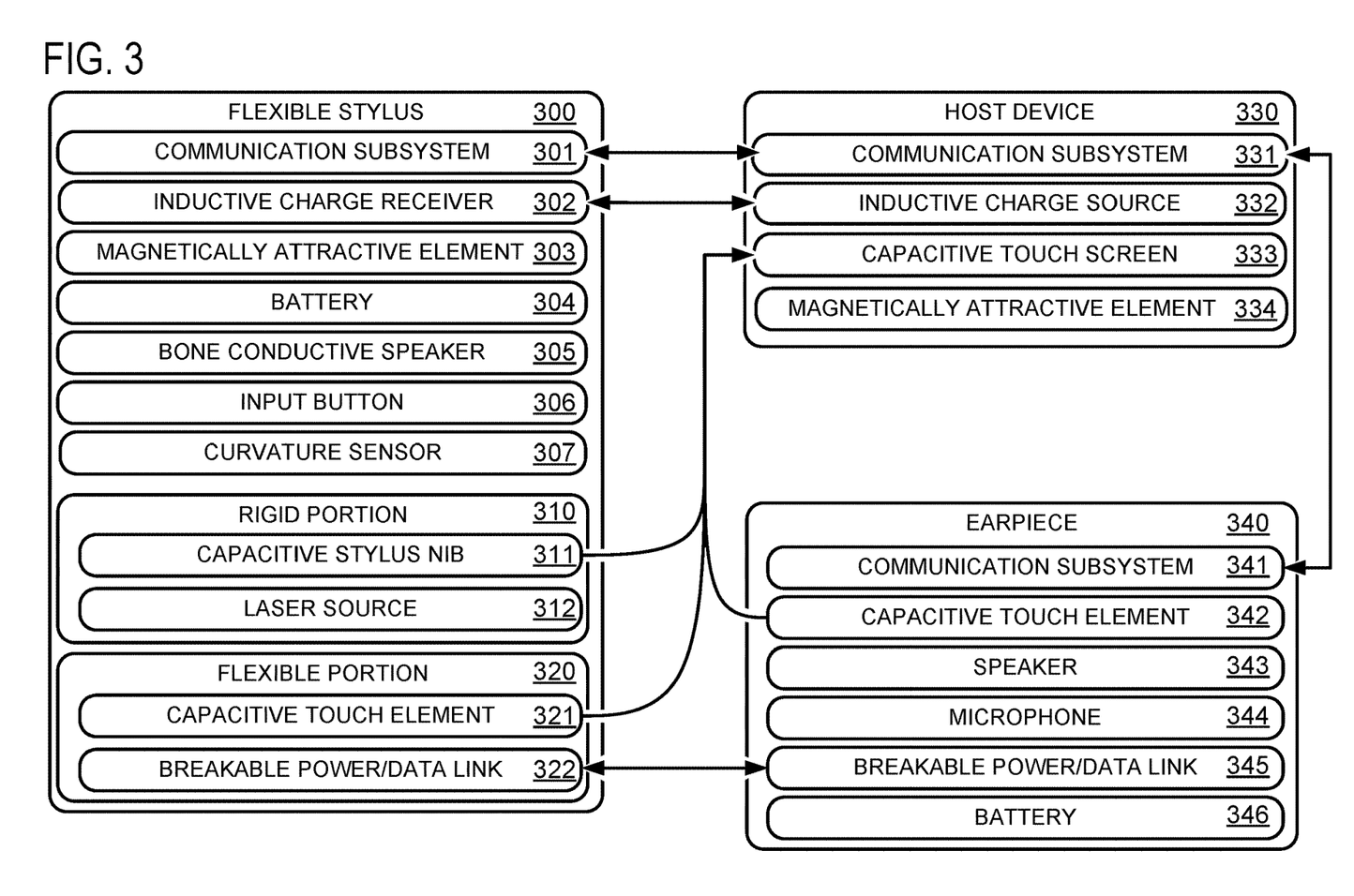
FIG. 3 schematically shows a computing system including a flexible stylus, a dockable earpiece, and a host computing device.

FIG. 3 shows aspects of a computing system including a flexible stylus 300, an earpiece 340, and a host device 330. Host device 330 includes a communication subsystem 331. Communication subsystem 331 may include a wireless radio or other suitable system for communicating with the flexible stylus 300. Host device 330 further includes a magnetically attractive element 334, which may serve as an attachment point for magnetically holding flexible stylus 300 to the chassis of host device 330 by magnetic attraction to a corresponding magnetically attractive element 303 of flexible stylus 300, e.g., for storage. Magnetically attractive element 303 of flexible stylus 300 may be housed in rigid portion 310 and/or in flexible portion 320. Host device 330 may further include a capacitive touch screen 333 which may allow a user to interact with host device 330 via a capacitive input object (e.g., a capacitive material such as capacitive stylus nib 311 or capacitive touch element 321 of flexible stylus 300, capacitive touch element 342 of earpiece 340, or one of the user's fingers). Capacitive touch screen 333 may include a display which may be used to present interactive content to the user, e.g., a graphical user interface (GUI) for interacting with one or more application programs. Capacitive touch screen 333 may measure a capacitance associated with an input object in order to determine a position of the input object with regard to a surface of the display. Additionally, capacitive touch screen 333 and/or host device 330 may include additional sensors and/or logic devices, which may determine additional features of an input object, e.g., determining acceleration and position of the input object before the input object contacts the surface of the display.

Host device 330 further includes an inductive charge source 332, which may inductively couple to a corresponding inductive charge receiver 302 of flexible stylus 300 in order to provide power to the flexible stylus 300. While the flexible stylus is in proximity to the host device, inductive charge receiver 302 may inductively couple to inductive charge source 332 and receive power from host device 330. Inductive charge receiver 302 may be disposed in any suitable part of flexible stylus 300, for example, within rigid portion 310. When flexible portion 320 comprises an articulated linkage of rigid segments (as described above with regard to FIGS. 2A-2B), inductive charge receiver 302 may be disposed within one or more rigid segments of flexible portion 320. Flexible stylus 300 may optionally include a stylus battery 304, which may similarly be disposed in any suitable location (e.g., within rigid portion 310 or within a rigid segment of flexible portion 320). Alternately, stylus battery 304 may be one of a plurality of stylus batteries. When stylus battery 304 is one of a plurality of stylus batteries, two or more rigid segments of flexible portion 320 may house different ones of the plurality of stylus batteries. For example, as described above with regard to FIGS. 2A-2B, rigid segment 211A may house stylus battery 304, and rigid segment 211B may house an additional battery of the plurality of batteries. Inductive charge receiver 302 and stylus battery 304 may provide power to any other components of flexible stylus 300. Breakable power/data link 322 may detect whether an earpiece is docked, and accordingly, when earpiece 340 is docked, operatively couple to earpiece 340 in order to supply and/or receive power and/or data. When earpiece 340 is docked, inductive charge receiver 302 and stylus battery 304 may provide power to components of earpiece 340. Flexible stylus 300 and/or earpiece 340 may include one or more visual indicators of a level of charge and/or charging status of stylus battery 304 and/or earpiece battery 346. For example, earpiece 340 may include one or more light-emitting diodes (LEDs) configured to emit a red light while the level of charge of earpiece battery 346 is below a threshold. In another example, flexible stylus 300 may include LEDs configured to emit a red light while the level of charge of stylus battery 304 is below a threshold, and to emit a green light while stylus battery 304 is charging (e.g., while receiving power via inductive charge receiver 302 from inductive charge source 332). Alternately or additionally, flexible stylus 300 and earpiece 340 may include any other suitable visual indicator of battery status. When inductive charge receiver 302 is inductively coupled to inductive charge source 332, host device 330 may additionally provide a visual indication of a level of charge and/or rate of charging for each of stylus battery 304 and earpiece battery 346, e.g., in a GUI displayed via capacitive touch screen 333.

Flexible stylus 300 may optionally include a curvature sensor 307 configured to detect whether flexible portion 320 is in a straight configuration or a curved configuration. Curvature sensor 307 may include one or more Hall effect sensors and/or any other suitable sensor or switch. In the example depicted in FIG. 2A, above, curvature sensor 307 may include a Hall effect sensor disposed across rigid segment 211A and rigid segment 211B of flexible portion 210, so that the movement of flexible portion 210 from a straight position (as in FIG. 2A) to a curved position (as in FIG. 2B) will result in a detectable variation in output voltage of the sensor.

Returning to FIG. 3, flexible stylus 300 may optionally include a communication subsystem 301 that communicatively couples the stylus to the host device. Communication subsystem 301 may be disposed in any suitable part of flexible stylus 300 and may comprise any suitable technology, e.g., IEEE 802.11x or IEEE 802.15.1 wireless radio. Such communicative coupling may be used in conjunction with any of the components or processes described in this disclosure. For example, such communicative coupling may be used to receive data from host device 330 and provide such data to earpiece 340 when earpiece 340 is docked, as an alternative or in addition to earpiece 340 receiving data directly via a communicative coupling between host device 330 and earpiece 340. In another example, such communicative coupling may be used to report a level of charge of stylus battery 304 to host device 330, so that host device 330 may provide a warning if the level of charge drops below a threshold.

Flexible stylus 300 may optionally include one or more logic devices. Such logic devices may control any components of flexible stylus 300 identified in this disclosure. For example, as will be described in more detail below with reference to FIGS. 6A-6C and 7, when flexible stylus 300 is configured to detect a docking status of the earpiece and/or a curvature of the stylus (e.g., via curvature sensor 307 and breakable power/data link 322), logic devices of flexible stylus 300 may determine the behavior of components of flexible stylus 300 and earpiece 340 based on such detection. In other implementations, the logic devices may be used to report information to a host device for remote determination of stylus behavior.

Flexible stylus 300 may optionally include a laser source 312 configured to emit a laser from flexible stylus 300. Laser source 312 may be housed in rigid portion 310, and may be configured to emit a laser from a cavity in the rigid portion (e.g., at the tip of capacitive stylus nib 311). When laser source 312 is turned on, the user may use flexible stylus 300 as a laser pointer.

Flexible stylus 300 may optionally include one or more input buttons 306. Input buttons 306 may be disposed on any outside surface of flexible stylus 300, e.g., on an outside surface of rigid portion 310 or disposed on an outside surface of a rigid segment of flexible portion 320. Input buttons 306 may be substantially flush with an outside surface of flexible stylus 300. The flush outside surface may improve the aesthetics and comfort of using flexible stylus 300. Alternately or additionally, input buttons 306 may be capacitive touch input buttons. Input buttons 306 may be used to control flexible stylus 300, earpiece 340, and/or host device 330 in any suitable manner. For example, input buttons 306 may be used to turn laser source 312 on or off. Additionally, input buttons 306 may control the generation and sending of packets via communication subsystem 301, which may be received by host device 330 and/or earpiece 340. For example, an input button may control sending a packet to earpiece 340 to indicate that audio playback volume should be increased. In another example, an input button may control sending a packet to host device 330 to indicate that a currently playing music track should be paused. In yet another example, input buttons 306 may be used as an interface for controlling a digital presentation (e.g., "next slide" and "previous slide" buttons). The functionality of input buttons 306 may be mapped to different functions by different executing applications of host device 330 and/or according to different user preferences.

Flexible stylus 300 optionally may be configured as an active stylus. For example, flexible stylus 300 may include one or more sensors configured to detect position, orientation, and/or acceleration of flexible stylus 300. Communication subsystem 301 may be configured to send packets to report sensor measurements to host device 330. For example, the one or more sensors may include an inertial measurement unit (IMU), and communication subsystem 301 may be configured to continuously send packets to host device 330 indicating a position and acceleration of flexible stylus 300 relative to capacitive touch screen 333 of host device 330. Such sensor data may be used, in conjunction with other data generated by flexible stylus 300, earpiece 340, and/or host device 330, to more accurately determine a position of flexible stylus 300 and to provide enhanced user interaction with host device 330 via flexible stylus 300. For example, position and acceleration of flexible stylus 300 may be used to determine whether flexible stylus 300 is "hovering" in proximity to capacitive touch screen 333, in advance of contact between flexible stylus 300 and capacitive touch screen 333. Detection of such "hovering" proximate to a hover position of the surface of capacitive touch screen 333 may be used to control host device 330. Additionally, input buttons 306 may be used in conjunction with active stylus features. For example, an input button may be used to provide "zoom screen" functionality allowing a user to magnify the view presented on capacitive touch screen 333, centering the view on a hover position of flexible stylus 300 at the time the button was pressed. In another example, flexible stylus 300 may include one or more sensors configured to detect a pressure force applied to capacitive stylus nib 311 when capacitive stylus nib 311 is pressed against a surface.

Earpiece 340 may dock at the earpiece dock in any suitable fashion. For example, when the earpiece dock includes breakable power/data link 322, earpiece 340 may include a corresponding breakable power/data link 345 which may engage with breakable power/data link 322 of flexible portion 320 when earpiece 340 is docked. In this manner, when earpiece 340 is docked, it may operatively couple to flexible stylus 300 in order to send/receive power and/or data. Breakable power/data links 322 and 345 may transmit power from flexible stylus 300 (e.g., from inductive charge receiver 302 and stylus battery 304) to earpiece 340. Earpiece 340 may further include an earpiece battery 346 which may be charged by power received via corresponding breakable power/data links 322 and 345.

Earpiece 340 may further include a communication subsystem 341 that communicatively couples the earpiece to the host device. Communication subsystem 341 may be disposed in any suitable part of earpiece 340 and may comprise any suitable technology, e.g., IEEE 802.11x or IEEE 802.15.1 wireless radio. Earpiece 340 may optionally include logic devices which may control delivery of power and data via breakable power/data link 345 to other components of earpiece 340. When included, the logic devices may further control the reception of data packets via communication subsystem 341, interpreting such data packets to produce an audio output at speaker 343, receiving microphone data from microphone 344, and based on such microphone data, generating data packets to send via communication subsystem 341.

Figure 4A:
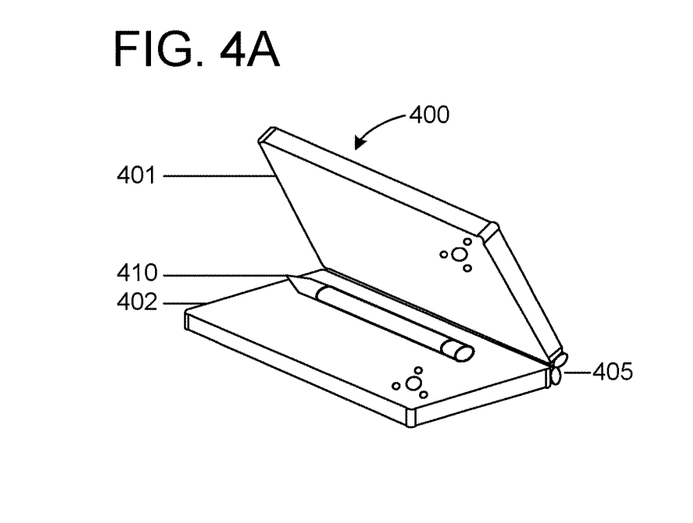
FIGS. 4A-4D show a stylus magnetically attached to an example host computing device.
Figure 4B:
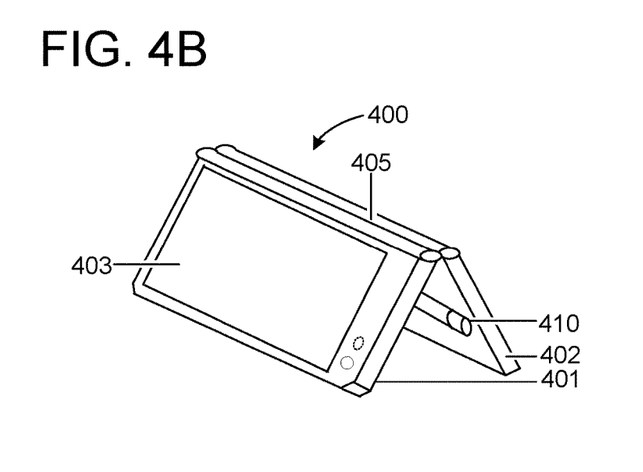
Figure 4C:
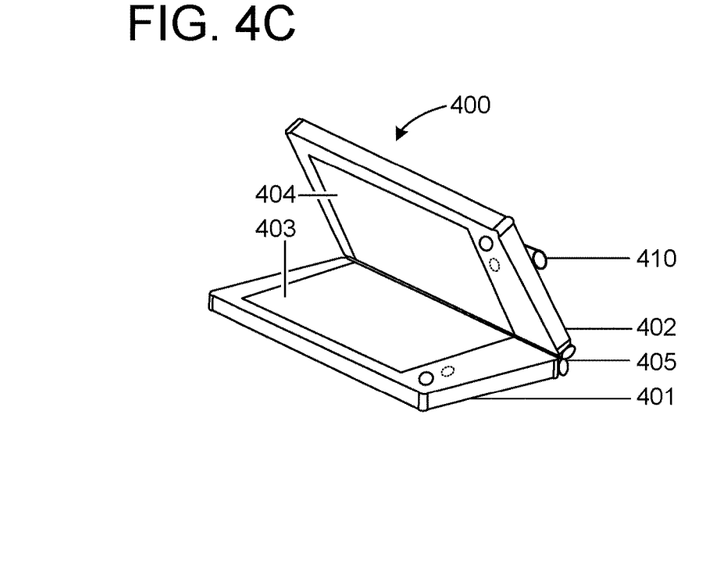
Figure 4D:
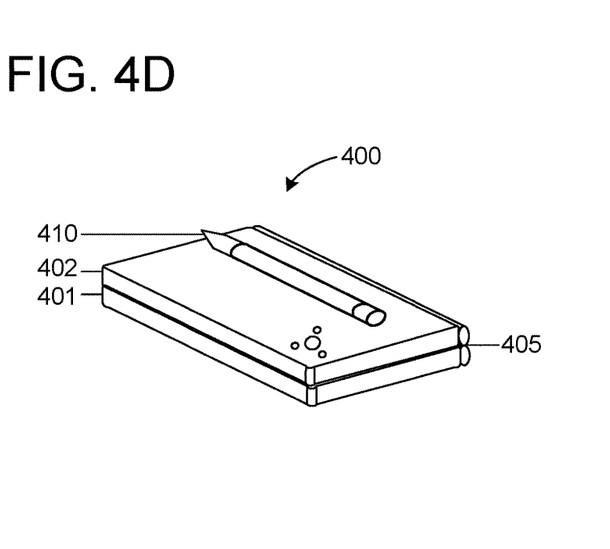

A host device configured for use with a flexible stylus may have a plurality of capacitive touch screens. Each capacitive touch screen may be associated with a separate display and enclosed in a separate part of the device housing. FIGS. 4A-4D and 5A-5D show an exemplary device with two such displays. Separate parts of the device housing corresponding to the separate displays may be connected with a joint (e.g., hinge 405). Additionally, a flexible stylus may be held to the device housing with magnetically attractive elements as described above with regard to FIG. 3. FIG. 4A shows hinge 405 holding device housing 401 and device housing 402 at an acute angle with the two displays facing away from each other. In this example, device housing 402 acts as a stand for device housing 401 and display 403 (on back face of device housing 401, concealed from view in FIG. 4A). FIG. 4B shows the same arrangement as FIG. 4A, but with the device rotated into a tent pose in which both displays are visible to a user. In this pose, the edges of device housing 401 and device housing 402 act as a stand for display 403 and display 404. FIG. 4C shows hinge 405 holding device housing 401 and device housing 402 at an acute angle with display 403 facing toward display 404. FIG. 4D shows hinge 405 folded to hold device housing 401 and device housing 402 substantially parallel, with the displays flush against one another. FIGS. 4A-4D show flexible stylus 410 held to the back of device housing 402.

Flexible stylus 410 may be magnetically held to any suitable part of device housing 401 or device housing 402. Suitable locations at which to magnetically hold flexible stylus 410 may be based on placement of internal components of host device 400. For example, an attachment location may be constrained by the placement of an inductive charge source in host device 400, to ensure sufficient proximity between flexible stylus 410 and host device 400 for inductive coupling. In other examples, an attachment location may be constrained by the placement of internal components of host device 400 which may be sensitive to the effects of magnetically attractive elements. For at least these reasons, it may be desirable to hold flexible stylus 410 to a back surface of device housing 401 or device housing 402 of host device 400, as depicted in FIGS. 4A-4D.

Figure 5A:
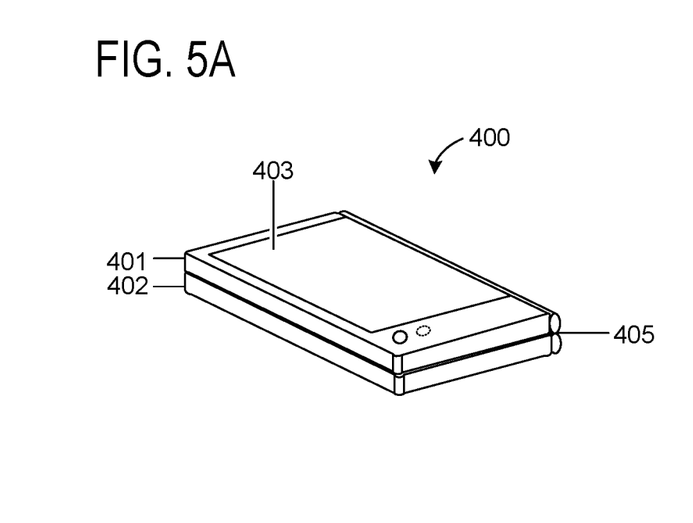
FIGS. 5A-5D show the example host computing device of FIGS. 4A-4D in alternate poses.
Figure 5B:
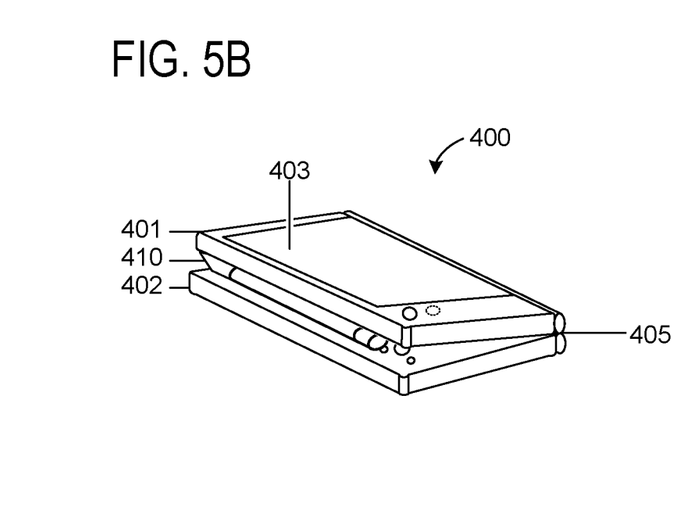
Figure 5C:
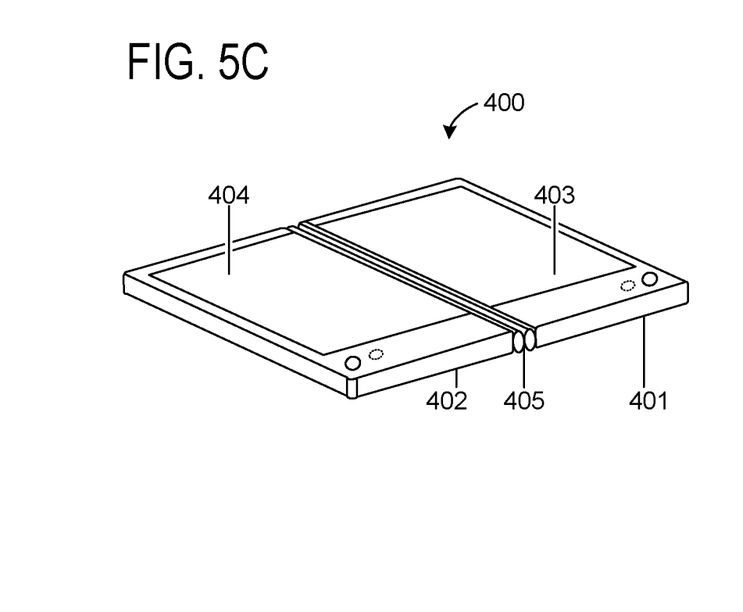
Figure 5D:
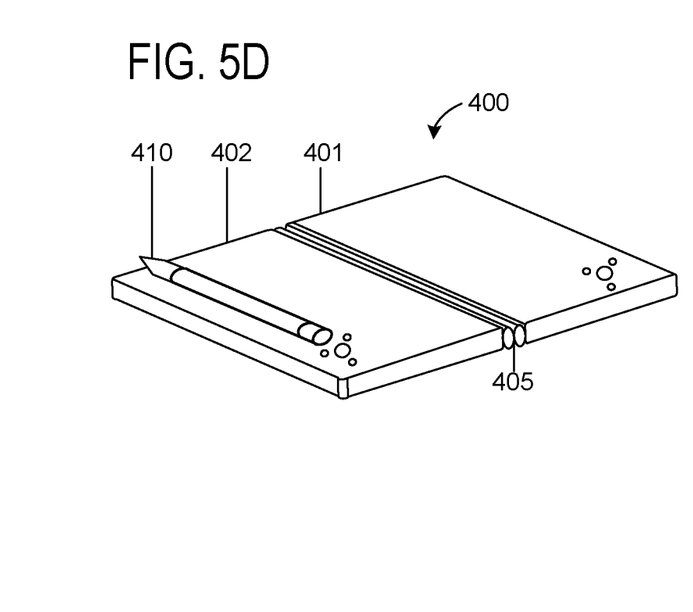

However, the two device housings 401 and 402 may be configured into some orientations in which the back sides of device housings 401 and 402 are not exposed, as shown in FIGS. 5A-5D. In these cases, if the stylus were held to a back surface of one of the device housings, then device housings 401 and 402 could not be folded to be substantially parallel. For example, FIG. 5A depicts host device 400 in a "back-to-back" configuration. Like the configuration of FIG. 4D, the two device housings 401 and 402 are substantially parallel. However, because the backs of device housings 401 and 402 are adjacent and flush, there is no space to magnetically hold a flexible stylus. Although hinge 405 may permit the two device housings 401 and 402 to be adjusted to make room for holding flexible stylus 410, as in FIG. 5B, this configuration would result in a small acute angle between the backs of device housings 401 and 402, instead of the backs being folded flush. As a result, host device 400 may not be as compact or comfortable to hold in the configuration shown in FIG. 5B. FIG. 5C shows the device housings 401 and 402 in a "side-by-side" configuration, with the display surfaces of displays 403 and 404 being substantially parallel and facing in a same direction. This configuration may be suitable for setting the device flat on a flat surface such as a desk or table. However, in this arrangement, the backs of device housings 401 and 402 would be flush with the flat surface, so there would again be no room to magnetically hold flexible stylus 410. As FIG. 5D shows, flexible stylus 410 could still be attached to a back surface of device housing 401 or device housing 402, but then host device 400 could no longer be set down to lie flat on a table with both screens substantially parallel and facing away from the table.

Figure 6A:
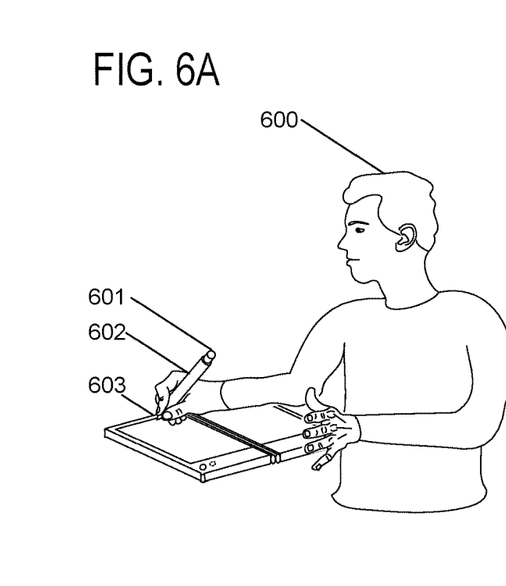
FIGS. 6A-6C show an example flexible carpenter's stylus in three different modes of operation.
Figure 6B:
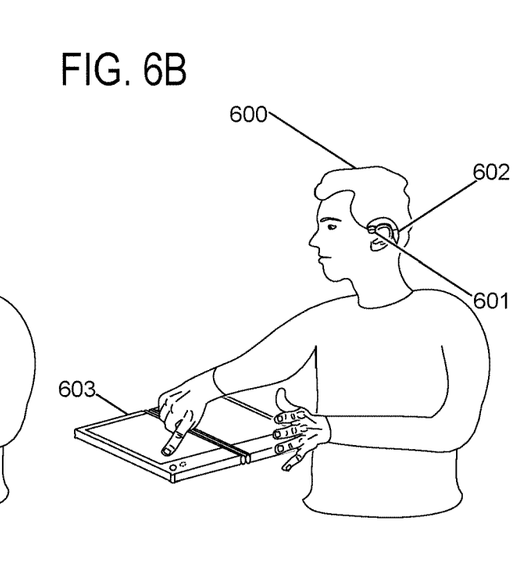

As such, when a user wishes to use host device 400 in the back-to-back or side-by-side configuration, it may not be convenient to store flexible stylus 410 by magnetically holding it to a back of the housing, and the user may want an alternate place to store the stylus. For example, FIG. 6A depicts a user 600 of a host device 603, with two displays as described above with reference to FIGS. 4A-4D and 5A-5D. User 600 is using host device 603 in the side-by-side configuration. In FIG. 6A, user 600 is using flexible stylus 602, which is in a straight configuration with earpiece 601 docked. However, when not using flexible stylus 602 to interact with host device 603, user 600 may want flexible stylus 602 to remain readily accessible. Accordingly, the computer peripheral disclosed herein may be stored by bending the flexible portion of flexible stylus 602 into a curved configuration to be worn around the user's ear. FIG. 6B shows user 600 wearing flexible stylus 602 on his ear. To enable user 600 to wear flexible stylus 602 and use it as a headset, flexible stylus 602 is in the curved configuration with earpiece 601 docked. Simultaneously, user 600 is interacting with host device 603 using a finger instead of flexible stylus 602. In this arrangement, flexible stylus 602 remains readily accessible, allowing user 600 to interact with host device 603 without the stylus. When flexible stylus 602 is worn around an ear and earpiece 601 is docked, flexible stylus 602 and earpiece 601 may act as a headset (e.g., by providing the microphone and speaker functionality of earpiece 601). The headset may provide audio output via the earpiece speaker, or via a bone-conductive speaker included in flexible stylus 602, as with bone conductive speaker 305 of flexible stylus 300 in FIG. 3. Bone conductive speaker 305 may be disposed in any suitable location. When flexible stylus 300 does not include a bone conductive speaker, the flexible portion may include a sound conveyance tunnel, as with sound conveyance tunnel 14 of flexible stylus 10 depicted in FIG. 1A. When included, sound conveyance tunnel 14 may be configured to transmit sound from earpiece 16 through the flexible portion of flexible stylus 10 when earpiece 16 is docked at earpiece dock 15. Returning to FIG. 6B, note that the flexible portion of flexible stylus 602 may be substantially flush against user 600's temple or other parts of user 600's face, which may improve fidelity of audio transmitted from the bone-conductive speaker. Further, as described above and as depicted in FIG. 6C, earpiece 601 may be removed from flexible stylus 602 and used separately. For example, if user 600 decides to resume using flexible stylus 602 to provide input to host device 603 while they are utilizing earpiece 601, they may wish to detach earpiece 601 from the dock of flexible stylus 602, in order to wear earpiece 601 separately from flexible stylus 602. Although FIG. 6A-6C depict a host device 603 with two displays, flexible stylus 410 may be used (in any of the three use cases depicted in FIGS. 6A-6C) as a peripheral of a device with one display or with any other suitable number of displays.

Figure 6C:
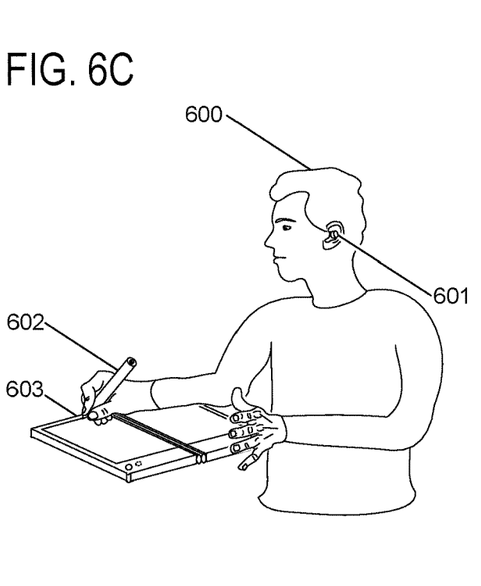

To provide appropriate functionality in each of the three use cases shown in FIGS. 6A-6C, the flexible stylus may be configured to operate in three different modes. In Mode 1, corresponding to the usage shown in FIG. 6A, the flexible stylus may be configured to act exclusively as a stylus, by turning off earpiece functionality. Note that in Mode 1, the flexible stylus may still provide power to the earpiece in order to charge the earpiece battery. In Mode 2, the flexible stylus may be configured to act exclusively as a headset, by turning on earpiece functionality and/or bone conductive speaker functionality, and by turning off other features of the flexible stylus (e.g., turning off active stylus features such as IMU sensors). In Mode 3, the flexible stylus may be configured to act as a stylus while the earpiece may be configured to simultaneously and independently act as an earpiece, by turning on earpiece functionality and features of the flexible stylus.

Figure 7:
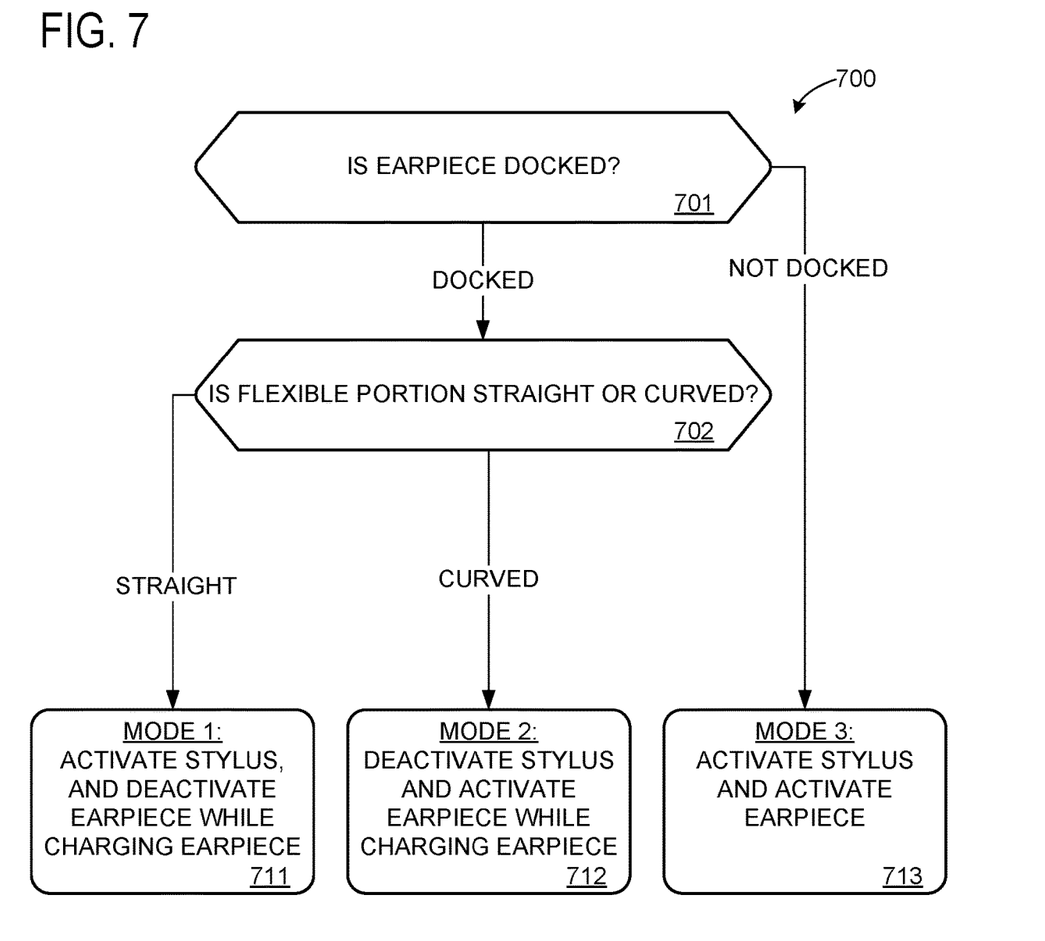
FIG. 7 shows an example method for determining a mode of operation for a flexible stylus.

Accordingly, FIG. 7 shows a flow diagram of a method 700 of determining one of the three modes (Mode 1, Mode 2, or Mode 3) and configuring the flexible stylus and earpiece accordingly. At 701, method 700 includes determining whether the earpiece is docked. When the earpiece dock includes a breakable power/data link, determining whether the earpiece is docked may include detecting whether the power/data link is connected or broken. Alternately or additionally, determining whether the earpiece is docked may be performed in any suitable manner, based on data from any suitable sensors and/or logic devices. If the earpiece is not docked, the stylus and earpiece are configured in Mode 3. Such configuration includes, at 713, activating the stylus and activating the earpiece.

If the earpiece is not docked, detecting the mode further includes, at 702, determining whether the flexible portion of the flexible stylus is in a straight configuration or a curved configuration. Detection of a curved configuration may be based on detecting a threshold amount of curve in the flexible portion. For example, when the flexible portion comprises an articulated linkage of rigid segments, detecting a curved configuration may be based on detecting any non-zero amount of curvature between any two adjacent segments. Alternately, detecting a curved configuration may be based on detecting above a predetermined threshold of curvature between any two adjacent segments. Alternately, detecting a curved configuration may be based on detecting a non-zero amount of curvature at more than one pair of adjacent segments. Such detection of curvature may be via measurements obtained from curvature sensors, when such sensors are included in the flexible stylus, or determined in any other suitable manner.

If the flexible portion is determined to be in a straight configuration, the stylus and earpiece are configured in Mode 1. Such configuration includes, at 711, activating the flexible stylus and deactivating the earpiece, while still charging the earpiece via power supplied from the stylus battery and/or power supplied directly after reception at an inductive charge receiver of the flexible stylus. If the flexible portion is instead determined to be in a curved configuration, the stylus and earpiece are configured in Mode 2. Such configuration includes, at 712, deactivating the flexible stylus and activating the earpiece, while still charging the earpiece. Method 700 may be performed by any suitable logic device included in the computer peripheral (within the flexible stylus and/or the earpiece), the host device, and/or any other suitable device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
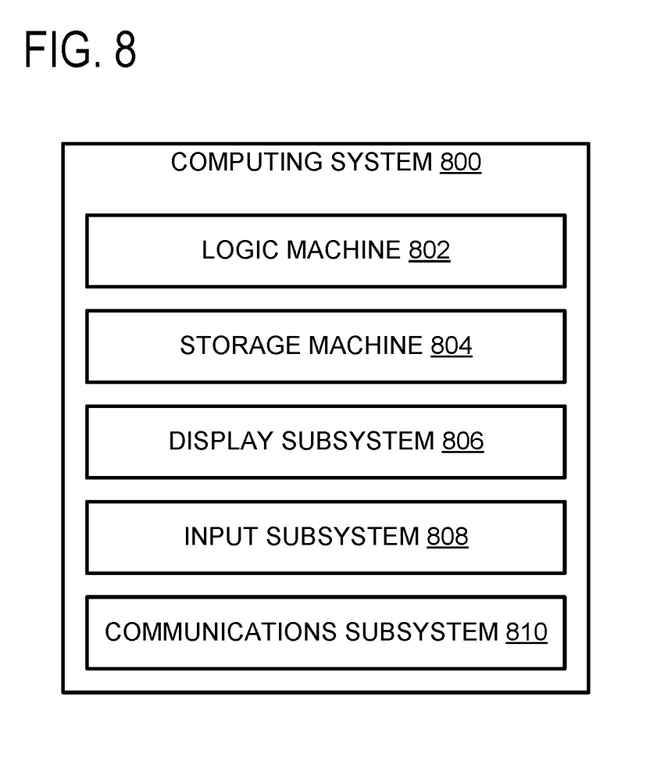
FIG. 8 shows an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices. For example, computing subsystem 800 may take the form of host device 330 as depicted in FIG. 3.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, game controller, or stylus (e.g., flexible stylus 10 as depicted in FIGS. 1A-1C, the flexible stylus as depicted in FIGS. 2A-2B, flexible stylus 300 as depicted in FIG. 3, flexible stylus 410 as depicted in FIGS. 4A-4D and 5A-5D, and/or flexible stylus 602 as depicted in FIG. 6). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition (e.g., microphone 344 of earpiece 340 as depicted in FIG. 3, a microphone of earpiece 16 of FIGS. 1A-1B, a microphone of earpiece 220 as described above with regard to FIGS. 2A-2B, and/or a microphone of earpiece 601 as described above with regard to FIG. 6). Other example NUI componentry may include an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices (e.g., with a flexible stylus or earpiece device as described in this disclosure, such as flexible stylus 10 and/or earpiece 16 as depicted in FIGS. 1A-1B, the flexible stylus and earpiece 220 as depicted in FIGS. 2A-2B, flexible stylus 300 and earpiece 340 as depicted in FIG. 3, flexible stylus 410 as depicted in FIGS. 4A-4D and 5A-5D, and/or flexible stylus 602 and/or earpiece 601 as depicted in FIG. 6). Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In an example, a computer peripheral comprises: a flexible stylus, the flexible stylus comprising a capacitive stylus nib, a rigid portion extending from the capacitive stylus nib, a flexible portion extending from the rigid portion distal to the capacitive stylus nib, an earpiece dock at the flexible portion distal to the rigid portion, and a stylus battery; an earpiece, removably dockable at the earpiece dock, the earpiece comprising a microphone, a speaker, an earpiece battery, and a wireless radio configured to communicatively couple with a host device; one or more magnetically attractive elements configured to magnetically hold the computer peripheral to the host device; and an inductive charger configured to wirelessly receive power via an inductive coupling with the host device and to use the power to charge the earpiece battery and the stylus battery. In this or any other example, the flexible stylus further includes one or more input buttons. In this or any other example, the flexible stylus has a non-circular cross section having at least one substantially flat edge. In this or any other example, the flexible portion is configured so that the substantially flat edge of the non-circular cross section remains in plane while the flexible portion is curved. In this or any other example, the stylus battery is housed in the rigid portion. In this or any other example, the inductive charger is housed in the rigid portion. In this or any other example, the rigid portion further includes a laser source configured to emit a laser. In this or any other example, the earpiece dock further includes a capacitive element with a capacitance distinct from the capacitive stylus nib. In this or any other example, the flexible portion includes a sound conveyance tunnel configured to transmit sound from the earpiece through the flexible portion while the earpiece is docked. In this or any other example, the flexible portion is made out of two or more rigid segments connected by joints. In this or any other example, the earpiece dock includes a recessed cavity at a terminal rigid segment of the flexible portion. In this or any other example, the stylus battery is housed in one of the rigid segments. In this or any other example, the stylus battery is one of a plurality of stylus batteries, and two or more of the rigid segments house different ones of the plurality of stylus batteries. In this or any other example, the earpiece dock further includes a magnetic connector and the earpiece is configured to attach to the magnetic connector. In this or any other example, the earpiece includes a capacitive element with a capacitance distinct from the capacitive stylus nib. In this or any other example, the computer peripheral further includes: one or more sensors configured to detect whether the flexible portion is in a straight configuration or a curved configuration; and a logic device configured to turn off the earpiece while the earpiece is docked and the flexible portion is in the straight configuration, turn off the flexible stylus while the earpiece is docked and the flexible portion is in the curved configuration, and turn on the flexible stylus and the earpiece while the earpiece is not docked. In this or any other example, the flexible stylus includes a bone-conductive speaker, and the earpiece is configured to provide sound output via the bone-conductive speaker when the earpiece is docked and the flexible portion is in the curved configuration. In this or any other example, the flexible stylus further comprises: an inertial measurement unit configured to measure one or more of a position, an orientation, and an acceleration of the flexible stylus; and a stylus radio configured to report one or more of the position, the orientation, and the acceleration to the host device.

In an example, a computer peripheral, having a main body including an earpiece dock, comprises: an earpiece, removably dockable at the earpiece dock, the earpiece comprising: a speaker, an earpiece battery, and a wireless radio configured to communicatively couple with a host device; and a charger configured to receive power; wherein the earpiece is configured to: while docked: use the power to charge the earpiece battery, receive audio data from the host device via the wireless radio, and based on the audio data, output sound via the speaker; and while not docked: receive audio data from the host device via the wireless radio, and based on the audio data, output sound via the speaker.

In an example, a computer peripheral comprises: a stylus, comprising a capacitive stylus nib and an earpiece dock; an earpiece, removably dockable at the earpiece dock, the earpiece comprising: a speaker, an earpiece battery, and a wireless radio configured to communicatively couple with a host device; and a charger configured to receive power, and while the earpiece is docked, to use the power to charge the earpiece battery.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer peripheral, comprising:
 a flexible stylus, comprising:
  a capacitive stylus nib,
  an earpiece dock;
  a flexible portion intermediate the capacitive stylus nib and the earpiece dock;
  a stylus battery, and
  one or more sensors configured to detect whether the flexible portion is in a straight configuration or a curved configuration; and
 an earpiece, removably dockable at the earpiece dock, the earpiece comprising:
  a speaker,
  an earpiece battery, and
  a wireless radio configured to communicatively couple with a host device;
 an inductive charger configured to wirelessly receive power via an inductive coupling with the host device and to use the power to charge the earpiece battery and the stylus battery; and
 a logic device configured to:
  turn off the earpiece while the earpiece is docked and the flexible portion is in the straight configuration;
  turn off the flexible stylus while the earpiece is docked and the flexible portion is in the curved configuration; and
  turn on the flexible stylus and the earpiece while the earpiece is not docked.

2. The computer peripheral of claim 1, where the flexible stylus further includes one or more input buttons.

3. The computer peripheral of claim 1, where the flexible stylus has a non-circular cross section having at least one substantially flat edge.

4. The computer peripheral of claim 3, where the flexible portion is configured so that the substantially flat edge of the non-circular cross section remains in plane while the flexible portion is curved.

5. The computer peripheral of claim 1, where the stylus battery is housed in a rigid portion of the flexible stylus extending between the capacitive stylus nib and the flexible portion.

6. The computer peripheral of claim 1, where the inductive charger is housed in a rigid portion of the flexible stylus extending between the capacitive stylus nib and the flexible portion.

7. The computer peripheral of claim 1, where the flexible stylus further includes a laser source configured to emit a laser.

8. The computer peripheral of claim 1, where the earpiece dock includes a capacitive element with a capacitance distinct from the capacitive stylus nib.

9. The computer peripheral of claim 1, where the flexible portion includes a sound conveyance tunnel configured to transmit sound from the earpiece through the flexible portion while the earpiece is docked.

10. The computer peripheral of claim 1, where the flexible portion is made of two or more rigid segments connected by joints.

11. The computer peripheral of claim 10, where the earpiece dock includes a recessed cavity at a terminal rigid segment of the flexible portion.

12. The computer peripheral of claim 10, where the stylus battery is housed in one of the rigid segments.

13. The computer peripheral of claim 10, where the stylus battery is one of a plurality of stylus batteries, and where two or more of the rigid segments house different ones of the plurality of stylus batteries.

14. The computer peripheral of claim 1, where the earpiece dock further includes a magnetic connector and where the earpiece is configured to attach to the magnetic connector.

15. The computer peripheral of claim 1, where the earpiece includes a capacitive element with a capacitance distinct from the capacitive stylus nib.

16. The computer peripheral of claim 1, where the flexible stylus includes a bone-conductive speaker, and the earpiece is configured to provide sound output via the bone-conductive speaker when the earpiece is docked and the flexible portion is in the curved configuration.

17. The computer peripheral of claim 1, where the flexible stylus further comprises:
    an inertial measurement unit configured to measure one or more of a position, an orientation, and an acceleration of the flexible stylus; and
    a stylus radio configured to report one or more of the position, the orientation, and the acceleration to the host device.

18. A computer peripheral comprising:
    a stylus, comprising:
        a capacitive stylus nib, and
        an earpiece dock;
    an earpiece, removably dockable at the earpiece dock, the earpiece comprising:
        a speaker,
        an earpiece battery, and
        a wireless radio configured to communicatively couple with a host device; and
    a charger configured to receive power, and while the earpiece is docked, to use the power to charge the earpiece battery;
    wherein one or both of the earpiece and the earpiece dock include a capacitive element having a capacitance distinct from the capacitive stylus nib.

19. A computer peripheral, comprising:
    a flexible stylus, comprising:
        a capacitive stylus nib,
        an earpiece dock,
        a flexible portion intermediate the capacitive stylus nib and the earpiece dock, the flexible portion including a sound conveyance tunnel,
        a stylus battery; and
    an earpiece, removably dockable at the earpiece dock, the earpiece comprising:
        a speaker,
        an earpiece battery, and
        a wireless radio configured to communicatively couple with a host device; and
    an inductive charger configured to wirelessly receive power via an inductive coupling with the host device and to use the power to charge the earpiece battery and the stylus battery;
    wherein the sound conveyance tunnel is configured to transmit sound from the earpiece through the flexible portion of the flexible stylus while the earpiece is docked.

20. The computer peripheral of claim 18, further including one or more sensors configured to detect whether the flexible portion is in a straight configuration or a curved configuration, and a logic device configured to:
    turn off the earpiece while the earpiece is docked and the flexible portion is in the straight configuration;
    turn off the flexible stylus while the earpiece is docked and the flexible portion is in the curved configuration; and
    turn on the flexible stylus and the earpiece while the earpiece is not docked.

21. A computer peripheral, comprising:
    a flexible stylus, comprising:
        a capacitive stylus nib,
        an earpiece dock;
        a flexible portion intermediate the capacitive stylus nib and the earpiece dock;
        a stylus battery, and
        one or more sensors configured to detect whether the flexible portion is in a straight configuration or a curved configuration; and
    an earpiece, removably dockable at the earpiece dock, the earpiece comprising:
        a speaker,
        an earpiece battery, and
        a wireless radio configured to communicatively couple with a host device;
    an inductive charger configured to wirelessly receive power via an inductive coupling with the host device and to use the power to charge the earpiece battery and the stylus battery; and
    a logic device configured to turn on the flexible stylus and the earpiece while the earpiece is not docked.

22. The method of claim 21, wherein the logic device is further configured to turn off the earpiece while the earpiece is docked and the flexible portion is in the straight configuration.

23. The method of claim 21, wherein the logic device is further configured to turn off the flexible stylus while the earpiece is docked and the flexible portion is in the curved configuration.

* * * * *